United States Patent [19]

Barnard et al.

[11] Patent Number: 4,946,287

[45] Date of Patent: Aug. 7, 1990

[54] AGITATOR FOR A FOOD MIXER AND METHOD OF USE THEREOF

[75] Inventors: John K. Barnard, Bay Village; David A. Brown, Rocky River, both of Ohio

[73] Assignees: Vita-Mix Corporation; Flurry International, Cleveland, Ohio

[21] Appl. No.: 373,459

[22] Filed: Jun. 30, 1989

Related U.S. Application Data

[63] Continuation-in-part of Ser. No. 53,073, May 21, 1987, abandoned, which is a continuation-in-part of Ser. No. 896,400, Aug. 14, 1986, abandoned.

[51] Int. Cl.$^5$ ............................................. B01F 7/16
[52] U.S. Cl. ............................................. 366/343
[58] Field of Search ............... 366/344, 343, 247, 249, 366/251, 241, 242, 245

[56] References Cited

U.S. PATENT DOCUMENTS

| | | |
|---|---|---|
| 1,407,789 | 2/1922 | Erhardt .............................. 366/344 |
| 1,460,125 | 6/1923 | Coleman ............................ 366/344 |
| 2,485,303 | 10/1949 | Marcus . |
| 2,637,537 | 5/1953 | Ernst .................................. 366/343 |
| 2,833,576 | 5/1958 | Cirone . |
| 3,369,265 | 2/1968 | Halberstadt . |
| 3,910,590 | 10/1975 | Ekstrom . |
| 4,132,489 | 1/1979 | Berg . |
| 4,159,182 | 6/1979 | Adolfson ........................... 366/343 |

*Primary Examiner*—Robert W. Jenkins
*Attorney, Agent, or Firm*—Renner, Kenner, Greive, Bobak, Taylor & Weber

[57] ABSTRACT

A disposable agitator (12, 12A) for a food mixer (10) includes an elongate hollow sleeve stem (16, 24) which fits over and rotates with an elongate rotatable shaft (11, 11A) of the mixer (10). An agitator blade (17, 25) configured in the shape of a bowl of a spoon is positioned at the bottom of the stem (16, 24). In one embodiment a detent (18) in the stem (16) engages a recess (14) in the shaft (11) while in another embodiment a barb (29) engages a flange (23) on the shaft to longitudinally position the agitator (12) on the shaft (11). The agitator is used by sliding the hollow stem (16, 24) upwardly over the shaft (11, 11A) to, in one embodiment, to cause the detent (18) to engage the recess (14), and in the other embodiment to cause the barb (29) to engage the flange (23). After mixing the food product, the user is induced to remove the agitator (12, 12A), because the blade (17, 25) is configured like the bowl of a spoon, by sliding the stem (16, 24) downwardly away from the shaft (11, 11A).

15 Claims, 3 Drawing Sheets

AGITATOR FOR A FOOD MIXER AND METHOD OF USE THEREOF

CROSS-REFERENCE TO RELATED APPLICATION

This is a continuation-in-part of our prior, copending application, Serial No. 053,073 filed May 21, 1987, now abandoned which was a continuation-in-part of our prior copending application, Serial No. 896,400 filed Aug. 14, 1986, now abandoned.

TECHNICAL FIELD

This invention relates to an agitator for a food mixer, such as a mixer of the type which will blend candy or other condiments into ice cream, milk shakes or the like. More particularly, this invention relates to an agitator, and its method of use, which is disposable insuring sanitary conditions without having to clean the agitator between usages, and which is readily positioned on the food mixer and removed therefrom by the user and subsequently used by the user to consume the food product.

BACKGROUND ART

For many years mixers with agitator shafts extending downwardly have been used to mix food items, such as milk shakes, right in a cup. More recently, similar mixers have been used to mix solid food chunks, such as candy and the like, into soft serve ice cream and other foods of similar texture. Since such mixers have permanent agitator shafts, frequent cleaning, most often between each use, is required because it is highly likely that each user will be blending different materials.

Such cleaning is quite time consuming for the commercial establishment which blends the product for the consumer and thus there is a need for a disposable agitator which could be quickly attached to the food mixer and readily and economically discarded after each use. The agitator shown in U.S. Pat. No. 2,833,576 represents an attempt to satisfy such need, however, it is impractical for many reasons. For example, were the device of that patent made of a material inexpensive enough to be economically disposable, the long unsupported agitator shaft would be so flimsy that first, it could not mix viscous food materials and second, at high speed operation it would flop around or oscillate outwardly possibly doing damage to the cup containing the food. In addition, the complex attachment of the agitator to the food mixer is not conducive to or compatible with the intended disposability. A retainer at the top of the shaft must be snapped into a plurality of metallic fingers having hooks thereon and then a spring is held by the hooks around the fingers. These metallic components with sharp edges also present a safety factor for the user whose hand could easily be injured were it to come into contact with the fingers or hooks spinning at high speeds.

Moreover, use of an agitator shown in U.S. Pat. No. 2,833,576 would be virtually impossible for the commercial establishment which invites the customer to blend his own product. In these instances the customer is given a cup and a spoon and he fills the cup with the food materials of his selection, uses the food mixer to blend the materials, and thereafter consumes the food with the spoon leaving the food mixer agitator contaminated with the remnants of his particular food material selection. If the commercial establishment were to provide the user with a spoon and the agitator according to the patent not only would the cost to the establishment be increased, and not only would the user be exposed to the problems and the hazards described above, but also the user would not be motivated to inconveniently remove the agitator and throw it away. Rather, he would leave it for the next user who might well, rather than removing the old agitator, throwing it away, and then assembling a new agitator, merely use the old agitator despite the potential contamination with foreign food materials.

Thus, to date, no one has developed an agitator assembly which is truly and economically disposable, which cannot represent a potential safety hazard to the user, and which by its configuration, will induce the user to remove it from the food mixer upon completion of the mixing.

DISCLOSURE OF THE INVENTION

It is thus a primary object of the present invention to provide an agitator for a food mixing device which can be manufactured sufficiently economically so as to be disposable and yet be strong enough to mix food materials.

It is another object of the present invention to provide an agitator, as above, which through its method of use can be readily utilized by the consumer himself without fear of injury.

It is a further object of the present invention to provide an agitator, as above, which is in the shape of a spoon so that by its method of use the consumer is induced to remove the same from the food mixer and utilize it as a utensil to eat the food product.

It is still another object of the present invention to provide an agitator, as above, in which the bowl of the spoon is axially offset from the shaft thereof to increase mixing action.

It is yet another object of the present invention to provide a method of using an agitator, as above, which is simple and suitable for performance by the ultimate consumer of the food product.

These and other objects of the present invention, which will become apparent from the description to follow, are accomplished by the improvements hereinafter described and claimed.

In general, a disposable agitator is designed for engagement with an elongate rotatable food mixer shaft having coupling means associated therewith. The shaft is tapered downwardly from a larger cross section to a smaller cross section. The agitator has a stem which is hollow along substantially its entire length and which has a similar taper as the shaft so as to be adapted to fit over, rotate with, and be fortified by the shaft. An agitator blade on the end of the stem is configured in the shape of the bowl of a spoon. The stem is provided with means to engage the coupling means of the shaft to position the stem longitudinally on the shaft.

The user slides the hollow stem upwardly over the shaft until the engaging means engages the coupling means and thereafter he mixes the food product with the agitator. Because the user will use the agitator as the utensil to consume the food, he is induced to remove the agitator by disengaging the engaging means from the coupling means and sliding the stem downwardly away from the shaft.

PREFERRED EMBODIMENTS FOR CARRYING OUT THE INVENTION

Figure 1:
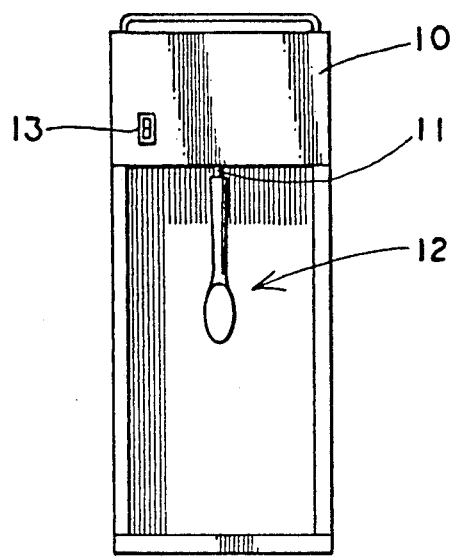
FIG. 1 is a schematic representation of a food mixer having a disposable agitator according to the concept of the present invention.

A conventional mixer 10 is shown schematically in FIG. 1 and includes a rotatable shaft 11 which carries the disposable agitator indicated generally by the numeral 12. Mixer 10 is equipped with a motor which, when activated by switch 13, rotates shaft 11 and agitator 12. Positioning a cup of ice cream or the like, to be mixed with candy or other condiments, so that agitator 12 is in the ice cream, results in a smooth blended product when shaft 11 is rotated.

Figure 2:
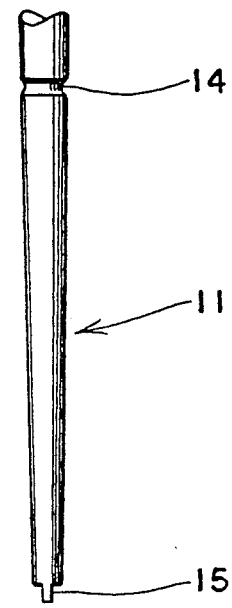
FIG. 2 is an elevational view of one embodiment of a rotatable drive shaft of the food mixer adapted to receive a disposable agitator.

One embodiment of shaft 11 is shown in detail in FIG. 2 as having an annular recess 14 near the top thereof and having a flat end 15 at the bottom thereof. As will hereinafter be described, recess 14 and flat end 15 serve as devices which enable coupling of shaft 11 to agitator 12 to prevent longitudinal and rotational movement of agitator 12 with respect to shaft 11. Shaft 11 can be constructed out of any durable material, such as stainless steel, and while it is shown as being tapered substantially along its entire length, it can take on an essentially cylindrical shape if desired.

Figure 3:
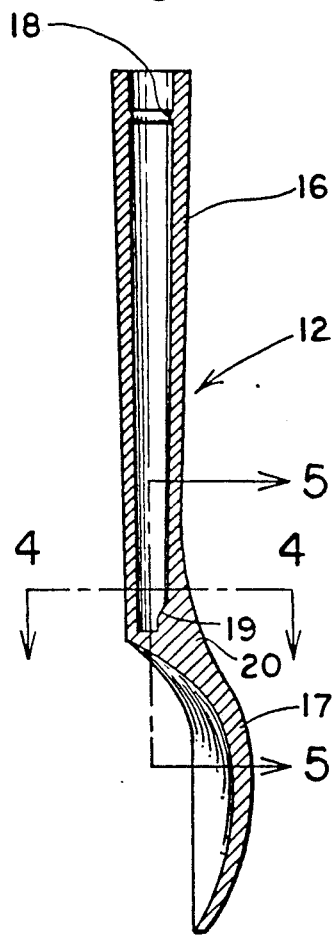
FIG. 3 is a sectional view through one embodiment of a disposable agitator designed for use with the shaft shown in FIG. 2.
Figure 4:
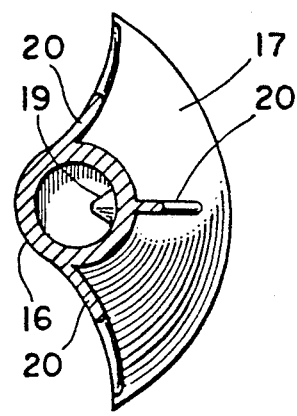
FIG. 4 is a sectional view taken substantially along line 4—4 of FIG. 3.
Figure 5:
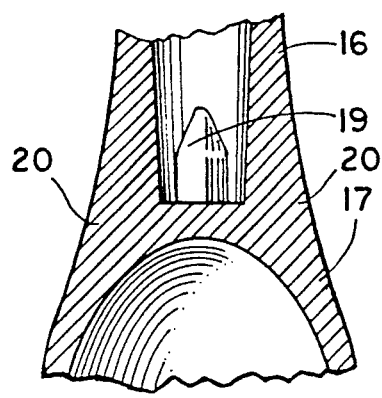
FIG. 5 is the sectional view taken substantially along line 5—5 of FIG. 3.

The embodiment of agitator 12 used with the embodiment of shaft 11 shown in FIG. 2 is best shown in FIG. 3 and is preferably made of an inexpensive material, such as many common plastics, so that it can be economically discarded after use. Agitator 12 includes a hollow sleeve stem portion 16 at one end and an agitator blade portion 17 at the other end. Stem 16 is shown as being tapered to correspond to the taper shown for shaft 11 although it will be appreciated that if shaft 11 were not tapered, stem 16 would also not be tapered but would rather correspond in configuration to that of shaft 11. Because stem 16 is a long hollow member and since it is intended to be economically disposable, the plastic material from which it is made needs the full support of shaft 11 so as to adequately mix even the most viscous food materials.

An annular detent 18 is provided internally of stem 16 near the top thereof for locking engagement with recess 14 of shaft 11 to secure agitator 12 longitudinally of shaft 11. A lug 19 is provided internally near the bottom of stem 16 generally at the point where stem 16 connects with blade 17. Lug 19 makes a dog-like engagement with flat 15 of shaft 11 so that agitator 12 will rotate with shaft 11 in a non-slip fashion.

While blade 17 could take the form of any eating utensil configuration, it is shown as being in the shape of the bowl of a spoon having reinforcing webs 20 to strengthen the transition between stem 16 and blade 17. Being so configured as a spoon, the agitator can serve the additional function of inducing the consumer to remove it from shaft 11 and then use it as a utensil for eating the product.

It should also be noted that the center of gravity of blade 17 is shown as being axially offset from the centerline of shaft 11 and stem 16 which has been found to enhance the agitating action. However, a blade 17 in line with the axis of rotation of shaft 11 could be constructed without departing from the spirit of this invention.

From the above description it should be appreciated that the disposable agitator 12 can readily be used by the consumer by attaching it to shaft 11 by sliding the sleeve stem 16 over shaft 11 until detent 18 snaps into recess 14. Upon rotation of shaft 11, flat end 15 will engage lug 19 and the sleeve stem 16 will rotate with the shaft so that blade 17 will mix the product in a cup held by the user. After completion of the mixing process, the user removes agitator 12 from shaft 11 and can thereafter utilize it as a utensil to consume the product. It should be appreciated that during the mixing process, sleeve stem 16 has protected shaft 11 from contact with the product and therefore no cleaning of shaft 11 is necessary preparatory to the next use.

Figure 6:
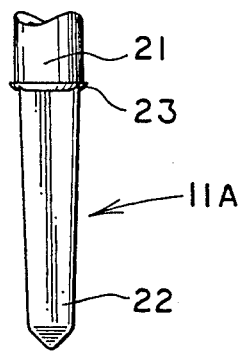
FIG. 6 is an elevational view of another embodiment of a rotatable drive shaft of the food mixer adapted to receive a disposable agitator.
Figure 7:
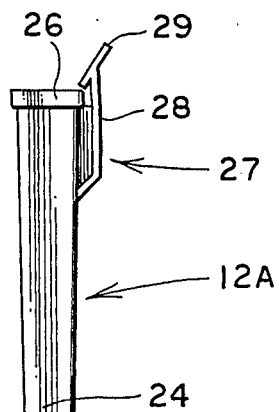
FIG. 7 is an elevational view of another embodiment of a disposable agitator designed for use with the shaft shown in FIG. 6.
Figure 8:
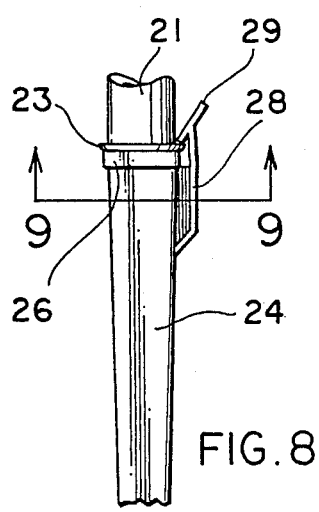
FIG. 8 is a partial elevational view of the disposable agitator of FIG. 7 attached to the rotatable drive shaft of FIG. 6.
Figure 9:
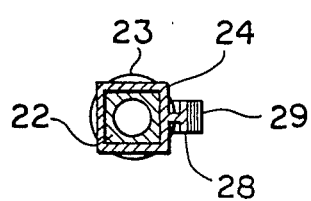
FIG. 9 is a sectional view taken substantially along line 9—9 of FIG. 8.

Another embodiment of a rotatable shaft is shown in FIG. 6 and identified generally by the numeral 11A. Shaft 11A has an upper cylindrical portion 21 attachable to the drive mechanism of mixer 10 and an elongate lower portion 22 designed to receive the alternate embodiment of the agitator indicted generally by the numeral 12A in FIG. 7. An annular flange 23 is provided at the junction of portions 21 and 22 of shaft 11A which, as will hereinafter be described in more detail, enables the coupling of shaft 11A to agitator 12A to prevent longitudinal movement of agitator 12A with respect to shaft 11A. Shaft 11A, like shaft 11, is normally constructed of a durable material, such as stainless steel, with the elongate lower portion 22 of shaft 11A being generally square in configuration, and while it is shown as being tapered, such is not critical to the spirit of this invention.

Agitator 12A, like agitator 12, is preferably made of an inexpensive plastic material and includes a hollow elongate sleeve stem portion 24 at one end and an agitator blade portion 25 at the other end. Stem portion 24 is hollow for its entire length and it can therefore be inexpensively manufactured rendering agitator 12A economically disposable. Blade portion 25 is shown as being essentially identical to blade portion 17 of FIG. 3, that is, in the shape of a bowl of a spoon so that the consumer is induced to remove it from the lower portion 22 of shaft 11A and use it as an eating utensil. Stem 24 is shown as being square in cross section to conform with lower portion 22 of shaft 11A and likewise, if desired, can be tapered, as shown. Stem 24 will thus rotate with shaft 11A.

The upper end of stem 24 of agitator 12A is provided with a collar 26 which mates with flange 23 of shaft 11A. A clip member indicated generally by the numeral 27 in FIG. 7 includes a resilient shank portion 28 extending outwardly from stem 24 of agitator 12A and terminating at its upper end as a barb portion 29 which extends upwardly over collar 26. Barb 29 engages flange 23 to secure agitator 12A longitudinally of shaft 11A.

Thus, disposable agitator 12A can be readily used by the consumer himself by sliding the hollow sleeve stem 24 over lower portion 22 of shaft 11A. Shaft 11A thus gives hollow stem 24 the needed support to mix even the most viscous of materials and yet still be made of an inexpensive material so as to be disposable. As barb 29 passes upwardly over flange 23, shank portion 28 of clip 27 will flex or otherwise be displaced outwardly until barb 29 is above flange 23 at which time shank portion 28 will snap inwardly so that barb 29 engages flange 23 and longitudinally locks agitator 12A to shaft 11A. The user can then conduct the mixing process in the identical manner and with the same advantages as described with respect to the embodiment shown in FIGS. 2-5. Once the mixing is completed, the user removes the agitator by displacing the clip thereby disengaging the barb from the flange and by sliding the stem downwardly away from the shaft so that the agitator may then be used as a utensil to consume the food product. Even a reluctant consumer is induced to so remove the agitator inasmuch as the blade is in the shape of the bowl of a spoon and the agitator thereby doubles as the eating utensil for the user. Shaft 11A is thereby maintained in a sanitary condition for the next consumer.

From the foregoing it should be evident that a disposable agitator constructed as described herein will accomplish the objects of the present invention and otherwise substantially improve the food mixing art.

I claim:

1. A disposable food mixer agitator for use by a consumer, the agitator being engageable with a rotatable elongate shaft, the shaft tapering downwardly from a larger cross section to a smaller cross section and including coupling means, the agitator comprising, an elongate plastic stem, said stem being hollow along its entire length and being adapted to fit over substantially the entire shaft and be strengthened thereby, said stem tapering downwardly from a larger cross section to a smaller cross section corresponding to the taper of the shaft, blade means on the lower end of said stem configured to induce the consumer to remove said stem from the shaft and use the agitator to consume the food, said blade means being in the shape of a bowl of a spoon and closing the lower end of said stem to prevent contamination of the shaft, and means on said stem to temporarily engage the coupling means of the shaft to temporarily position said hollow stem longitudinally on the shaft and permit rotation of said stem and said blade means with the shaft so that said blade means will mix the food after which time the consumer is induced by said blade means to remove said stem from the shaft and consume the food with the agitator thereby preventing contamination of the shaft from exposure to different food items.

2. A disposable food mixer agitator according to claim 1 wherein said coupling means of the shaft includes a generally annular flange near the top thereof and said means on said stem to engage the coupling means includes clip means engaging said flange.

3. A disposable food mixer agitator according to claim 2 wherein said clip means includes a resilient shank portion attached to the outside of said stem and a barb portion on the end of said shank portion, said barb portion extending above said stem and engaging said flange.

4. A disposable food mixer agitator according to claim 1 wherein said blade means is axially offset from the axial center of the shaft and said stem.

5. A disposable food mixer agitator according to claim 1 wherein the shaft includes a portion generally square in cross section and said stem is also generally square in cross section to fit over said shaft portion to permit rotation of said stem and said blade with the shaft.

6. A disposable food mixer agitator according to claim 5 wherein said coupling means of the shaft includes a generally annular flange near the top thereof and said means on said stem to engage the coupling means includes clip means engaging said flange.

7. A disposable food mixer agitator according to claim 6 wherein said clip means includes a resilient shank portion attached to the outside of said stem and a barb portion on the end of said shank portion, said barb portion extending above said stem and engaging said flange.

8. A disposable food mixer agitator according to claim 1 wherein the shaft is generally cylindrical and tapers downwardly from a larger diameter to a smaller diameter and said stem is generally cylindrical and correspondingly tapers downwardly from a larger diameter to a smaller diameter.

9. A disposable food mixer agitator according to claim 8 wherein the coupling means of the shaft includes an annular recess and said means on said stem to engage the coupling means includes a detent on the inside of said stem to engage the annular recess.

10. A disposable food mixer agitator according to claim 9 further comprising second means on said stem to engage the coupling means to permit rotation of said stem and said blade with the shaft.

11. A disposable food mixer agitator according to claim 10 wherein the coupling means of the shaft includes a flat end projecting from the bottom of the shaft and said second means on said stem to engage the coupling means includes a lug on the inside of said stem to engage the flat end upon rotation of the shaft.

12. A disposable agitator for a food mixer having a rotatable shaft of a generally polygonal cross section and tapering downwardly from a larger cross section to a smaller cross section, the shaft having a generally annular flange thereon near the top thereof, the agitator comprising, a plastic stem being hollow along its entire length and having a generally polygonal cross section and taper corresponding to the taper of the shaft so that said stem can be fit over the shaft by the user and be rotatable with and gain added support from the shaft, an agitator blade in the shape of a bowl of a spoon carried at and closing the lower end of said stem, and clip means near the upper end of said stem to engage the flange on the shaft so that the user can temporarily secure said stem longitudinally on the shaft, said clip means including a resilient shank portion attached to the outside of said stem and a barb portion on the upper end of said shank portion and extending above the top of said stem to engage the flange.

13. A disposable agitator for use by a consumer with a food mixer having a rotatable shaft of a generally polygonal cross section and tapering downwardly from a larger cross section to a smaller cross section, the shaft having a generally annular flange thereon, the agitator comprising, a hollow stem of a plastic material being hollow for substantially its entire length and having a generally polygonal cross section and taper corresponding to the taper of the shaft so that said stem can be fit over the shaft by the consumer, be strengthened by the shaft, and be rotatable with the shaft, means on the end of said stem to agitate the food and to induce the consumer to remove said stem from the shaft, said means on the end of said stem being of a plastic material and configured in the shape of a bowl of a spoon so that the consumer may consume the food product with the agitator, said means at the end of said stem closing the lower end of said stem to prevent contamination of the shaft, and clip means near the upper end of said stem to engage the flange on the shaft so that the consumer can temporarily secure said stem longitudinally on the shaft, said clip means including a resilient shank portion attached to the outside of said stem and extending upwardly above said stem, and a barb portion on the upper end of said shank portion to engage the flange.

14. A method for enabling a user to mix a food product in a food mixer for subsequent consumption by the user, the food mixer having an elongate rotatable shaft with a flange near the top thereof, the user having been provided with a disposable agitator having an elongate hollow stem with a clip carrying a barb near the top thereof and the bottom thereof being configured like the bowl of a spoon comprising the steps of reinforcing the hollow stem by sliding the hollow stem upwardly over the shaft of the agitator, snapping the barb over the flange by displacing the clip to thereby secure the agitator on the shaft, mixing the food product with the agitator, displacing the clip to disengage the barb from the flange, sliding the hollow stem downwardly away from the shaft, and using the agitator as a utensil to consume the food product.

15. A method for enabling a user to mix a food product himself in a food mixer for subsequent consumption by the user, the food mixer having an elongate shaft with a flange near the top thereof comprising the steps of providing the user with a plastic agitator with an elongate hollow stem having a clip and a barb near the top thereof, the user thereafter sliding the hollow stem upwardly over substantially the entire shaft of the food mixer thereby reinforcing the stem, snapping the barb over the flange by laterally displacing the clip, mixing the food product with the agitator, the user being induced to remove the agitator from the shaft because the end of the agitator is in the configuration of the bowl of a spoon by displacing the clip to disengage the barb from the flange, and sliding the stem downwardly away from the shaft so that the user can thereafter use the agitator as a utensil to consume the food.

* * * * *